June 3, 1952   O. BRUMMER   2,598,886

CARTRIDGE TYPE SEAL

Filed June 9, 1949

Inventor:
Olin Brummer
By A. Trevor Jones
Atty

Patented June 3, 1952

2,598,886

UNITED STATES PATENT OFFICE 2,598,886

CARTRIDGE TYPE SEAL

Olin Brummer, Crete, Ill.

Application June 9, 1949, Serial No. 98,077

5 Claims. (Cl. 286—11)

This invention relates to a cartridge type seal device for sealing the environs between relatively rotatable structures such as shafts and their bearings, one such useful application being in water pumps of automobile engines, the designation implying that the entire seal assembly with its parts pre-loaded and non-explosive are contained within a shell as in a cartridge.

The seal device in the present invention is particularly adapted for assemblies in which the seal device remains stationary while at the same time providing a seal both to the bearing housing and to the rotating shaft, thus simplifying the pump design and particularly obviating the necessity for providing a recess in the pump impeller hub to receive the seal, since, by the use of the present invention, the complete unitary seal device may be simply inserted in the bore of the bearing housing to remain stationary therein while the shaft and impeller rotate.

In an important aspect, the present invention contemplates a shell which may receive a high compression coil spring of a length before insertion in the shell substantially longer than the shell and retaining such a high compression spring in the shell against so-called explosion while at the same time permitting a rubber-like contractible and expansible member to be inserted in the shell after the spring has been inserted, and to be under the influence of the spring, while at the same time making a sealing engagement with the shell so that the whole constitutes a unitary pre-loaded and non-exploding device integrated for rapid and positive assembly in the pump mechanism.

These and other objects will be apparent from the following detailed description, taken together with the accompanying drawings, of an illustrative embodiment of the invention, and in which drawings—

Figure 1:
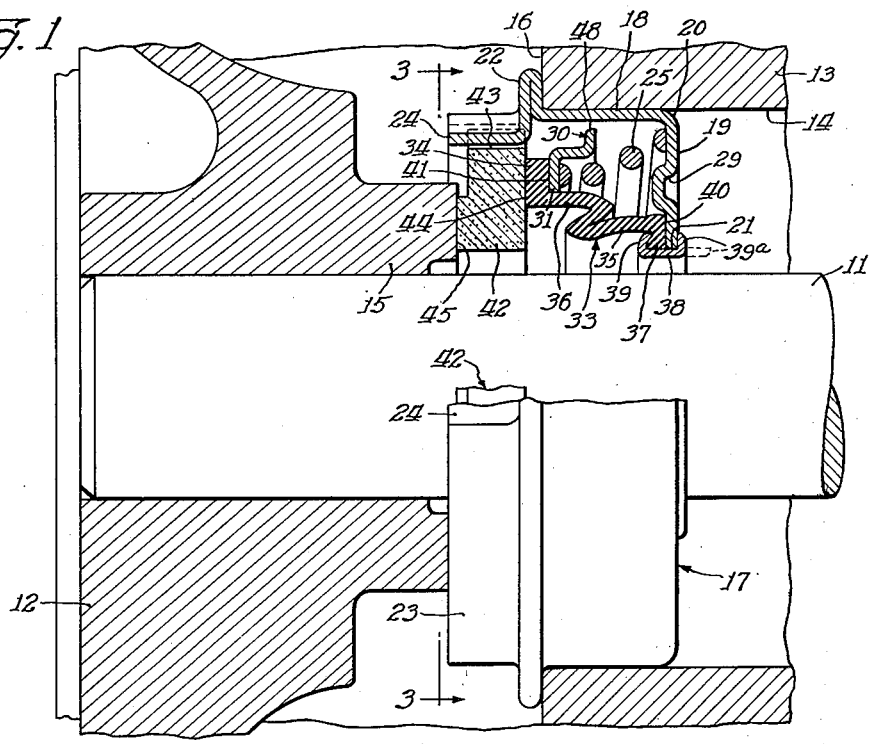
Figure 2:
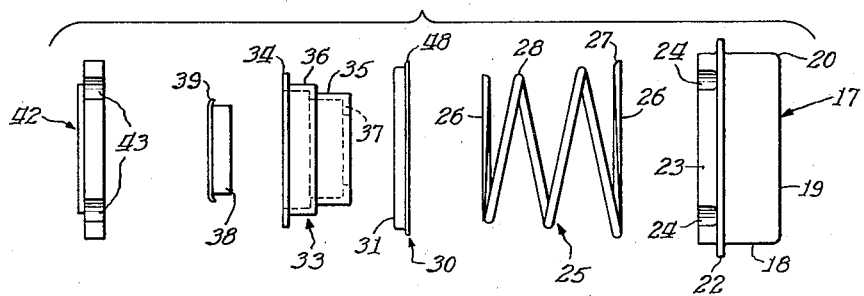
Figure 3:
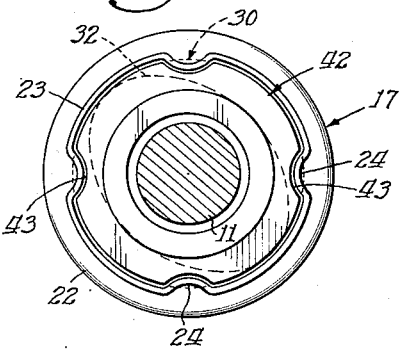

Figure 1 is an enlarged axial view, partially in section, of a unitary seal device in accordance with the present invention, as applied to a rotatable element and its bearing housing;

Figure 2 is a so-called exploded view of the unitary seal parts reduced in size from Figure 1, showing their separated relationships before assembly; and Figure 3 is an end view, or view taken on line 3—3 of Fig. 1 of the unitary seal device, on a scale slightly larger than Fig. 2 but somewhat smaller than Fig. 1, an alternative position of one of the parts during assembly being indicated in broken lines.

Referring in detail to the illustrative construction shown in the drawings, numeral 11 indicates a rotatable shaft which might be for a water pump and which has fixed thereon and rotatable therewith a rotor 12 such as a pump impeller. 13 indicates a portion of the bearing housing for the shaft 11, this housing having a hole or bore 14 therein spaced from the shaft and in which may be located the usual bearing members, which need not be here shown, to rotatably support the shaft and impeller in the bearing housing.

As applied to a water pump, the seal of the present invention is adapted to be received with a tight press fit as a complete assembled unit in the bore 14 of the housing, spaced from the shaft 11, and making a seal at one place with the impeller hub 15 and at another place with the wall of the bore 14.

For this purpose, and in accordance with the present invention, the seal parts include a cup-like shell 17 preferably formed of metal and having an outer cylindrical wall 18 and a rear radially extending wall 19 with a somewhat rounded corner 20 therebetween which facilitates insertion into the bore 14, the tight fit of the shell therewith maintaining the shell non-rotatively in the bore to resist the torque forces thereon. The wall 19 is spaced from the shaft 11 and has a central opening 21 therein through which the shaft rotatably passes. At its outer end, the shell 17 has its outer cylindrical wall 18 formed, as by a replicate fold 22, into an annular enlargement that is adapted to abut the end 16 of the bearing housing both to limit insertion of the seal assembly into the bore 14, and guarding against incorrect placing. At its extreme end or mouth adjacent the enlargement 22, the shell 17 is continued further cylindrically as at 23 and this cylindrical continuation of the shell carries inwardly directed formations or stakings 24, these being spaced circumferentially about the mouth of the shell and there being desirably four uniformly spaced such indentations or stakings, as best seen in Fig. 3.

It will be understood that all the parts of the seal device shown assembled in Fig. 1 and disassembled in Fig. 2 are advantageously pre-assembled with the shell 17 at the factory, and conveniently the coil spring 25 is first inserted in the shell 17. The coil spring is importantly of a length before compression substantially longer axially than the length of the shell 17, as clearly seen from Fig. 2, and, furthermore, the spring desirably contains at least four complete convolutions as seen from the drawing, thus providing a high pressure spring within a relatively short axial space and promoting well distributed spring pressure. The end coils 26 are advantageously flattened somewhat as shown and at least one end convolution as 27 preferably at the inner end of the shell is enlarged in diameter, while an intermediate convolution, as 28, may be advantageously reduced in diameter, thus effecting a slight nesting action of the spring coils upon compression in the seal device which contributes to a saving of axial distance, while permitting the number of coils shown. The radially extending wall 19 of the shell 17 is shown concentrically embossed, as at 29, so as to take the larger rear coil of the spring thereabout and so providing a beneficial centering action for locating the spring in the shell upon insertion and maintaining it in proper position therein during use.

Next, the spring pre-load ring or clip 30 is desirably inserted to hold the spring in the shell under compression, the clip being desirably centrally dished as at 31 to receive the smaller outer end of the spring therein. It will be understood that the overall diameter of the clip 30 is greater than the internal diameter across a pair of the inwardly directed formations 24 in the shell, so that the clip abuts these formations on the interior of the shell after the spring and clip have been inserted. The invention permits that the formations 24 be preferably formed in the shell prior to insertion of the spring, since it would be difficult if not impossible to form them thereafter when a high pressure spring such as here contemplated is used. Furthermore, it is highly desirable, with such high-pressure spring, that the device be non-explosive in any rotative position of the clip in the shell. To make it unnecessary to provide notches in the periphery of the clip, I have discovered that it is possible to tilt it, for example, to the position shown in broken lines 32 (Fig. 3) to get it past the inwardly directed formations 24, with the spring under compression in the shell, if it be so tilted that it passes two adjacent formations 24 simultaneously. The clip and spring may be removed in the same way when desired, but in use the clip would not become tilted to such position and that is desirable so that the spring will be normally non-explosive when in operation.

Next in assembly, and advantageously after the insertion of the spring and clip, is inserted the annular rubber-like sealing member 33, which, in this instance, has a radially extending flange 34 at one end and an annular portion of reduced diameter 35 at its other end, with a contractible and expansible intermediate portion 36 of angular or relatively telescoping cross-section. The portion 35 of reduced diameter as best seen in Fig. 1 has an inwardly directed annular flange 37 which cooperates with a grommet or ferrule 38, which may be partially preformed to pass into the rubber-like member 33 and through the central opening 21 for the purpose of effecting a sealing engagement of the inner end of the rubber-like member with the interior of the shell, and, in this instance, the radially extending rear wall of the shell. The ferrule 38 has an annular flange 39 at one end, which abuts the flange 37 of the member. After insertion through the clip and spring with the ferrule extending through the central opening 21 in the shell radial wall, the outer end of the ferrule is swaged as at 39a over the shell wall about the margin of the opening to pinch or rivet the flange 37 thereto.

As so constructed, the sealing member 33 with unswaged ferrule 38 therein may be put into the shell even though the spring 25 and clip 30 are already in the shell, the clip having a central opening large enough to receive the portions 35 and 36 of the rubber-like sealing member while leaving the radially extending flange 34 of the sealing member in axial abutment with and outwardly of the clip. Thus, there is effected a sealing engagement of the reduced sealing member portion 35 and the interior of the shell, as at 40, and a sealing engagement of the flange 34 of the sealing member with the outer face of the clip, as at 41.

The embossment 29 is of additional utility in locating and maintaining the reduced end 35 of the sealing member 33 in position, since it provides a seat between the grommet 38 and the embossment 29 for the flange 37 of the rubber-like sealing member.

The seal device structure thus far described may have utility as a sub-combination on some occasions without the sealing disk or thrust washer 42 next referred to, as, for example, if the thrust washer be lost or broken in handling, or worn or broken in use, the remainder of the parts will normally remain in useful assembly and in position to receive a replacement washer readily.

For the purpose just referred to, the thrust washer 42, which may be, for example, of antifriction material such as carbon impregnated with graphite, is desirably slidingly received in the mouth of the shell and not locked against axial movement therein while yet being locked against rotation relative thereto. To effect the latter, the washer is shown having notches 43 in its periphery registering with the inwardly directed formations 24 of the shell. If desired, the washer 42 may be cemented or otherwise bonded to the rubber member of flange 34 either before or after assembly.

So constructed and arranged, a sealing engagement is effected between the outer face of the rubber-like sealing member flange 34 and the inner face of the washer 42 as at 44. At the same time, the outer face of the sealing washer 42 may have rotative or running sealing engagement with the end of the impeller hub 15 at 45, the meeting surfaces being desirably closely ground or lapped to maximize a fluid seal thereat and the washer being of friction minimizing material.

It will be understood when the seal device is out of assembly from the working position shown in Fig. 1, the periphery 48 of the ring clip 30 will be in contact with the stakings 24 in the shell, the clip thus being moved forward axially in a direction outwardly of the shell to its maximum distance under the influence of the expansive force of the spring 25, the spring even at this time having substantial potential energy due to the fact that its normal expanded length is substantially in excess not only of the distance between the shell radial wall 19 and the stakings 24 but also substantially in excess of the overall axial length of the entire shell. At this time also, the radial flange 34 of the rubber-like member will be moved by the spring and clip in a direction outwardly of the shell so that the contractible and expansible portion 36 of the sealing member is uncollapsed, as shown in Fig. 2. Here also, the thrust washer 42 will be just entered into the mouth of the shell, axially movable therein but held from rotation by the interengagement 24—43 between the shell and washer.

When now the seal device is placed into assembly as shown in Fig. 1, the thrust washer and the other movable parts of the seal are pressed farther into the shell so that the periphery 48 of the ring clip moves rearwardly away from engagement with the stakings 24. As the washer 42 wears in use, and also to accommodate axial variations in the position of the shaft 11, the spring 25 expands the seal parts outwardly to compensate, substantial potential travel for this purpose being permitted. A spring of the character here described eliminates hard spots and effects even washer wear.

While effecting an improved seal, the seal parts may all remain stationary with the bearing housing and spaced from and out of contact with the shaft, thus minimizing heating effects and other deleterious influences of a fast rotating shaft upon seal parts. Furthermore, the seal being of the so-called unitary cartridge type, assembly is simple and fool-proof, since insertion in the housing bore may be made in only one relationship. Again, this high pressure spring provides enhanced efficiency and duration of the sealing function, minimizing replacements for wear, while shell 17 has a snug press fit in the bore 14.

It will be understood that by the term "high pressure" with reference to the spring here shown no more is necessarily meant than that the spring is relatively long for a relatively short shell, while having more than the number of coils previously commonly used, as broadly disclosed and claimed in my prior pending application S. N. 626,095, filed November 1, 1945, now Patent No. 2,499,353 issued March 7, 1950.

The invention is not intended to be limited to details of construction shown for purposes of exemplification. Such changes may be made as fall within the scope of the appended claims without departing from the invention.

The invention having been described, what is here claimed is:

1. In a cartridge type seal device embodying a shell having a cylindrical wall and a radially extending rear wall, in combination, circumferentially spaced indentations in said cylindrical wall at the shell outer end, a spring preload ring clip in said shell between said indentations and said rear wall, a coil spring compressed between said rear wall and said clip, said spring contacting the inner side of said rear wall, said clip having a centrally forwardly dished portion of smaller diameter than said indentations to receive one end of the spring and having a rearwardly disposed peripheral flange of larger diameter than said indentations to abut the latter within the shell under the influence of the spring, and a rubber-like sealing member having a rear end within and in sealing engagement with the shell on the same side of the rear wall of the shell that said spring contacts, said sealing member having an annular radially extending flange at its forward end of smaller diameter than said indentations in axial abutment with and outwardly of said clip dished portion, whereby the spring may be pre-loaded in said shell and the rubber-like member thereafter inserted.

2. The structure of claim 1 wherein a sealing disk is in axial abutment with said first mentioned flange and has notches registering with said indentations to provide for axially sliding but rotatably fixed engagement of the disk with the shell.

3. The structure of claim 1 wherein the shell rear wall is concentrically annularly embossed and the spring is of conoidal form and has its larger convolution at its rear end surrounding said embossment and a smaller convolution at its forward end received in said dished portion of the clip.

4. In a cartridge type seal device embodying a shell having a cylindrical wall and a radially extending wall having a central opening to receive a shaft therethrough, an annular rubber-like sealing member received in said shell and having an end of reduced diameter abutting the radially extending wall on the inner face thereof without projecting into said opening, gripping means effecting a sealing engagement of said sealing member end of reduced diameter with said shell about said central opening whereby the sealing member is spaced from the shaft, a coil spring disposed about the sealing member between the sealing member and the cylindrical wall and having one end abutting said radially extending wall, an annular preload clip abutting the other end of said spring, said gripping means being free of said spring and clip, and means carried by the shell engaging the clip to limit movement of the spring and clip outwardly of the shell, said sealing member having a radially enlarged annular flange disposed outwardly of said clip, whereby the spring may be pre-loaded in the shell and the sealing member thereafter inserted and said sealing engagement effected.

5. In a cartridge type seal device embodying a shell having a cylindrical wall and a radially extending rear wall with a central opening to receive a shaft therethrough, an annular rubber-like member received in the shell having a radially extending flange at one end thereof and an annular portion of reduced diameter at its other end disposed about said central opening and abutting the rear wall on the inner face thereof without projecting into said opening, said portion of reduced diameter having a radially inwardly directed annular flange, a metallic grommet in said central opening gripping said last mentioned flange and said rear wall and riveted thereover to effect a seal between said shell and rubber-like member, a compression coil spring in said shell encircling said member between the member and the cylindrical wall and having one end pressing against said rear wall, a spring preload clip between said first mentioned flange and the other end of said spring, and inwardly directed formations spaced circumferentially of the shell cylindrical wall limiting movement of the spring and clip outwardly of the shell.

OLIN BRUMMER.

REFERENCES CITED

The following references are of record in the file of this patent:

UNITED STATES PATENTS

| Number | Name | Date |
| --- | --- | --- |
| 2,395,953 | Bertea | Mar. 5, 1946 |
| 2,426,047 | Payne | Aug. 19, 1947 |
| 2,432,694 | Snyder | Dec. 16, 1947 |
| 2,441,344 | Bosworth | May 11, 1948 |
| 2,444,713 | Solari | July 6, 1948 |
| 2,497,704 | Voytech | Feb. 14, 1950 |
| 2,499,353 | Brummer | Mar. 7, 1950 |